US009148289B2

(12) United States Patent
Tan et al.

(10) Patent No.: US 9,148,289 B2
(45) Date of Patent: Sep. 29, 2015

(54) METHOD FOR STREAMING VIDEO DATA

(75) Inventors: Wai-Tian Tan, Sunnyvale, CA (US);
Gene Cheung, Tokyo (JP); Bo Shen, Fremont, CA (US); Antonio Ortega, Los Angeles, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 972 days.

(21) Appl. No.: 12/812,174

(22) PCT Filed: Jan. 30, 2008

(86) PCT No.: PCT/US2008/052463
§ 371 (c)(1),
(2), (4) Date: Aug. 11, 2010

(87) PCT Pub. No.: WO2009/096959
PCT Pub. Date: Aug. 6, 2009

(65) Prior Publication Data
US 2010/0306403 A1    Dec. 2, 2010

(51) Int. Cl.
*G06F 15/16* (2006.01)
*H04L 12/18* (2006.01)

(52) U.S. Cl.
CPC .................................. *H04L 12/1827* (2013.01)

(58) Field of Classification Search
USPC .................................. 709/231, 236, 201, 202
See application file for complete search history.

(56) References Cited

U.S. PATENT DOCUMENTS 6,536,043 B1 *  3/2003  Guedalia ......................... 725/90
6,539,124 B2 *  3/2003  Sethuraman et al. ......... 382/251
6,970,510 B1    11/2005  Wee et al.
7,425,981 B2 *  9/2008  Kamariotis ................. 348/14.13
2007/0003154 A1 *  1/2007  Sun et al. ....................... 382/254

OTHER PUBLICATIONS

Chang et al., "Improving Network Video Quality with Delay Cognizant Videa Coding", Depart of Elec Engineering and Comp Sciences, UC Berkeley~Jan. 1998 27-31.
Chang et al., "Segmentation and Compression of Video for Delay-flow Multimedia Networks", Dept of Elec Engineering & Comp Sciences, UC Berkeley~Jun. 1998 2985-2988.
Cheung, et al., "Graphics-to-Video Encoding for 3G Mobile Game Viewer Mulitcast Using Depth Values", HP Labs. 2004 Int'l Conf on Image Processing~Mar. 2004 pp. 2805-2808.
Hsu et al., "Joint Selection of Source and Channel Rate for VBR Video Transmission Under ATM Policing Constraints", IEEE Jrl Select Areas in Comm V15 N6 Aug. 1997~pp. 1016-1028.
ITU-T, "Video Coding for Low Bit Rate Communication", ITU-T Recommendation H.283, (Jan. 13, 2005), 1-226.
Kahmann, et al., "Collaborative Streaming and Dynamic Scenarios", Communications of the ACM, vol. 49, No. 11, (Nov. 2006),58-63.
Laksham, et al., "VBR Video: Tradeoffs and Potentials", Proceedings of the IEEE, vol. 86, No. 5 May 1998, 952-973.

(Continued)

*Primary Examiner* — Lan-Dai T Truong
(74) *Attorney, Agent, or Firm* — Wagner Blecher, LLP

(57) ABSTRACT

A method for streaming video data. Video data is received. At least one frame of the video data is segmented into a plurality of regions. Video data corresponding to a first region of the plurality of regions is transmitted over a network. The video data corresponding to a second region of the plurality of regions is modified according to interactive input. The video data corresponding to a modified version of the second region is transmitted over the network.

13 Claims, 7 Drawing Sheets

(56) References Cited

OTHER PUBLICATIONS

Ortega, et al., "Optimal Trellis-Based Buffered Compression and Fast Approximations", IEEE Transactions on Image Processing, vol. 3, No. 1, (Jan. 1994),26-40.

Rosenberg, et al., "SIP: Session Initiation Protocol", The Internet Society, (2002) pp. 1-269.

Salehi et al., "Supporting Stored Video: Reducing Rate Variability and End-to-End Resource Requirements Through Optimal Smoothing", IEEE/ACM Trans onNetwkg Aug. 1998 pp. 397-410.

Schulzrinne, et al., "Real Time Streaming Protocol (RTSP)", Network Working Group, (Apr. 1998),1-92.

Shacham et al., "Ubiquitous Device Personalization and Use: The Next Generation of IP Multimedia Communications", ACM Trans. Multi Comput. Commun. Appl#12 May 2007 pp. 20.

Tse et al., "Statistical Multiplexing of Multiple Time-Scale Markov Streams", IEEE Journal on Selected Areas in Communications, vol. 13, No. 6, Aug. 1995, pp. 1028-1038.

Wiegand, et al., "Overview of the H.264/AVC Video Coding Standard", IEEE Trans on Circuits and Systems for video technology, vol. 13, No. 7, Jul. 2003, 560-576.

Zhu, C. "RTP Payload Format for H.263 Video Streams", Intel Corporation, (Sep. 1997),1-12.

* cited by examiner though the embodiments of the present invention are
METHOD FOR STREAMING VIDEO DATA

FIELD

Various embodiments of the present invention relate to the field of streaming video.

BACKGROUND

Streaming video applications are used for facilitating the transmission of different types of video streams. For instance, in an interactive streaming video application, the content of the video stream is subject to changes in perceived real-time, e.g., in response to user's actions. An example of such an interactive application is video conferencing. In contrast, in a non-interactive streaming video application, e.g., in a Video-on-Demand (VoD) system, the video content does not change due to interactivity. It is understood that the transmission of interactive streaming video is associated with significantly more stringent processing and timing requirements, and therefore cost, than non-interactive streaming video. In particular, low end-to-end delay is generally required to provide lively user interactivity.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
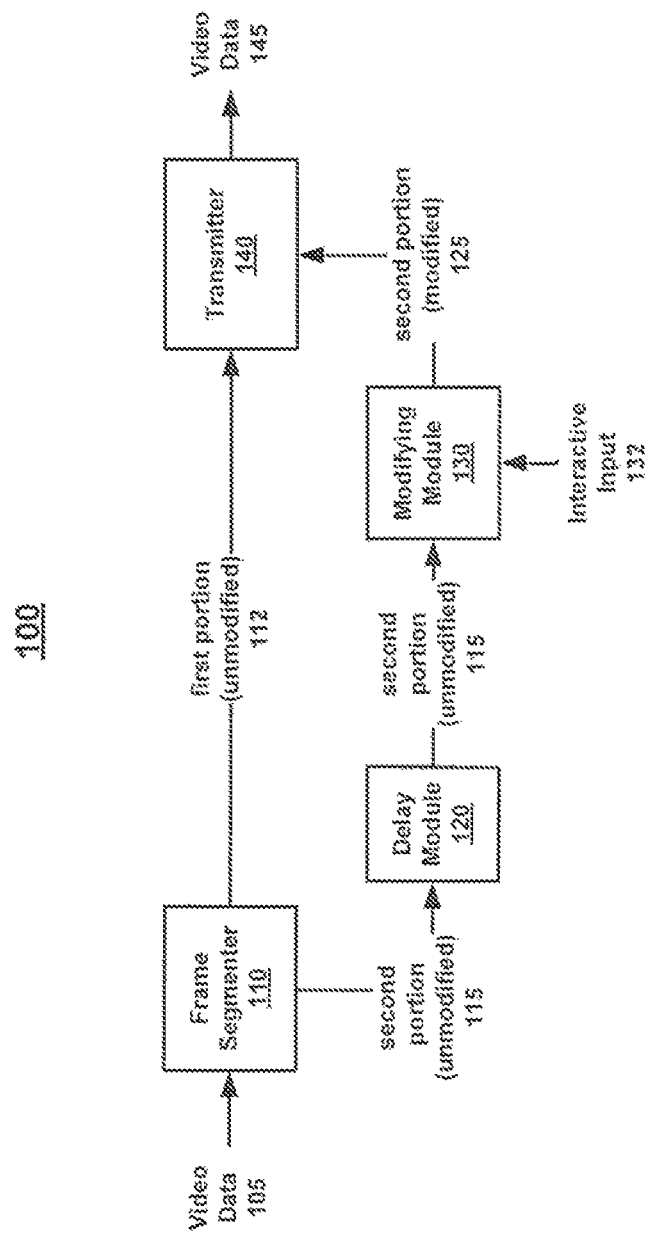
FIG. 1 is a block diagram of a system for streaming video data, in accordance with one embodiment of the present invention.

The drawings referred to in this description should not be understood as being drawn to scale except if specifically noted.

DESCRIPTION OF EMBODIMENTS

Various embodiments of the present invention, streaming video data, are described herein. In one embodiment, a method for streaming video data is described. Video data is received. At least one frame of the video data is segmented into a plurality of regions. Video data corresponding to a first region of the plurality of regions is transmitted over a network. The video data corresponding to a second region of the plurality of regions is modified according to interactive input. The video data corresponding to a modified version of the second region is transmitted over the network.

Embodiments of the present invention provide a method for streaming video data including localized interactivity where only a portion of the main presentation is modified according to interactivity. For example, many interactive streaming video applications, such as personalized ad-insertion, interactive television, and video-enabled remote collaboration tools utilize localized interactivity. Embodiments of the present invention allow applications with localized interactivity to transmit non-interactive portion of their data, e.g., video data corresponding to one region of video frames, using long-delay streaming methods while transmitting an interactive portion of the data, e.g., video data corresponding to another region of video frames, using short-delay methods to facility interactivity. It should be appreciated that by transmitting the non-interactive portions of the video data without using short delay transmission methods, embodiments of the present invention can provide for reducing the transmission and processing resource costs.

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Although the embodiments of the present invention are described with respect to the streaming of video data, it should be understood that embodiments of the present invention are not limited to the streaming of video data. It should be appreciated that embodiments of the present invention also apply to other types of media, including without limitation: audio-based data, image-based data, graphics data, video-based data, text-based data, web page-based data, and the like. Moreover, it should be appreciated that embodiments of the present invention can also be applied to on-demand transmission, including synchronous (e.g., live), asynchronous (e.g., time-shifted), or download.

FIG. 1 is a block diagram of a system 100 for streaming video data, in accordance with one embodiment of the present invention. System 100 includes frame segmenter 110, delay module 120, modifying module 130 (e.g., FIG. 2), and transmitter 140. In one embodiment, system 100 is implemented in a computing device capable of communicating over a network connection (not shown). For example, system 100 may be any type of computing device, including without limitation computers, cellular telephones, personal digital assistants, television sets, set-top boxes, and any other computing device capable of receiving and transmitting data over a network.

It should be appreciated that frame segmenter 110, delay module 120, modifying module 130 and transmitter 140 can be implemented as software, hardware, firmware, or any combination thereof. Moreover, it should be appreciated that system 100 may include additional components that are not shown so as to not unnecessarily obscure aspects of the embodiments of the present invention.

Frame segmenter 110 receives video data 105. Video data 105 includes a plurality of frames. It should be appreciated that video data 105 can include any kind of streaming video data. For example, video data 105 can include real-time video data or pre-recorded video data. It should be appreciated that real-time video data may include inherent delays, but that the video data is substantially real-time from the perspective of an observer.

In one embodiment, video data 105 is encoded using the H.263 video coding standard. However, it should be appreciated that embodiments of the present invention can also include video data 105 encoded using other video coding standards, including without limitation H.264/AVC and MPEG-4 video coding standards.

Embodiments of the present invention are used for streaming video data including localized interactivity. For example, in applications such as personalized ad-insertion, interactive TV and video-enabled remote collaboration tools, only a small subset of the main presentation is modified according to interactive input.

Frame segmenter 110 is operable to segment at least one frame of video data 105 into a plurality of regions. In one embodiment, two regions of a frame are identified in which one region of the frame is identified as fixed region and the remaining region is a modifiable region. In order to facilitate the modification of the modifiable region independent of the non-interactive region, frame segmenter 110 separates the frame into a plurality of independently decodable regions.

Figure 3A:
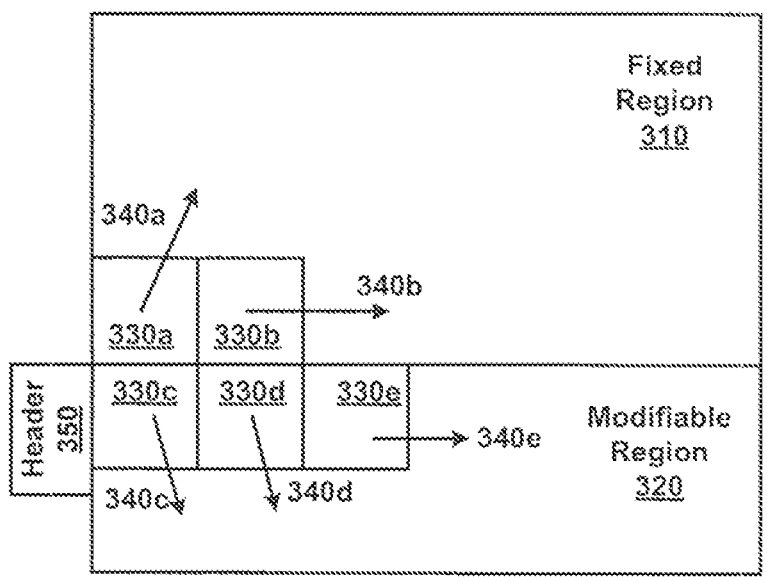
FIG. 3A illustrates an example segmenting operation for generating independently decodable regions of a video frame, in accordance with one embodiment of the present invention.

FIG. 3A illustrates an example segmenting operation for generating independently decodable regions of a video frame 300, in accordance with one embodiment of the present invention. For purposes of the instant specification, the interactive region is defined as a number of macroblock (MB) rows at the bottom of a video frame. However, it should be appreciated that the interactive region can be defined as any shape within a video frame, and is not limited to the MB granularity level. For example, the interactive region can be defined at the pixel level. Furthermore, it should be appreciated that embodiments of the present invention may include more than one interactive region.

In one embodiment, frame segmenter 110 is configured to generate two independently decodable regions: fixed region 310 that is comprised of the top several MB rows, and modifiable region 320 comprising of the remaining MB rows. It should be appreciated that independently decodable regions refers to the relationship wherein fixed region 310 can be decoded without reliance on modifiable region 320, and modifiable region 320 can be decoded without reliance on fixed region 310.

It should be appreciated that, in accordance with other embodiments, frame segmenter 110 is configured to generate two separate regions in which only one region is independently decodable. In one embodiment, fixed region 310 is independently decodable from modifiable region 320, but modifiable region 320 may be dependent on fixed region 310 for decoding. For example, since fixed region 310 for a corresponding frame is transmitted before modifiable region 320 for the same frame, modifiable region 320 may rely on fixed region 310 for decoding.

In one embodiment, MBs in fixed region 310 and modifiable region 320 are encoded in such a way that a motion vector (MV), indicated as arrows on FIG. 3A, of a MB does not point outside of the region that the MB belongs to. For instance, MBs 330a and 330b in the bottom MB row of fixed region 310 are restricted not to having MVs 340a and 340b pointing downwards, while MBs 330c, 330d and 330e in the top MB row of modifiable region 320 are restricted to have not having MVs 340c, 340d and 340e pointing upwards, as illustrated in FIG. 3A. In one embodiment a Group of Block (GOB) header 350 (as defined in the H.263 syntax) is inserted at the beginning of the first MB row in modifiable region 320 to facilitate identification of bitstream corresponding to modifiable region 320, and to ensure that modifiable region 320 is independently decodable.

Figure 3B:
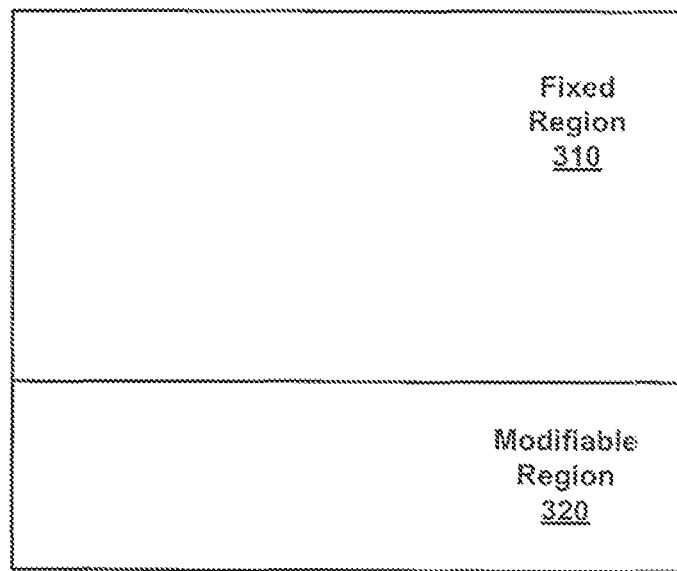
FIG. 3B illustrates an example frame have two regions, in accordance with one embodiment of the present invention.

FIG. 3B illustrates an example frame 360 having two independently decodable regions, in accordance with one embodiment of the present invention. Frame segmenter 110 is configured to generate fixed region 310 and modifiable region 320. With reference to FIG. 1, frame segmenter 110 sends a first portion 112 of the video data including the fixed region to transmitter 140 and sends a second portion 115 of the video data including the modifiable region to modifying module 130. Accordingly, modifying module 130 only operates on modifiable region 320, without decoding the fixed region 310.

Referring to FIG. 1, in another embodiment, the separable video is created with dependency from the modifiable region to the fixed region (but not vice versa). In the present embodiment, the compressed fixed region needs to be decoded. This approach leads to more computation overhead at system 100. However, since there are fewer restrictions on MVs when creating the separable video, it may lead to gain in coding performance. In the present embodiment, where only one region is independently decodable, MBs in a fixed region do not point outside of the fixed region and MBs in a modifiable region may point outside of the modifiable region.

In another embodiment, the coding of the modifiable region can be further restricted to use zero MVs. This approach requires less computing in modifying the modifiable portion, since all the overlay operations can now be completed on intra or residual data without motion compensation in its preceding decoder.

In one embodiment, second portion 115 is received at delay module 120 prior to modifying module 130. Delay module 120 is configured to delay second portion 115 a predetermined time, allowing for the receipt of interactive input 132 at modifying module 130. It should be appreciated that delay module 120 is typically configured to delay the transmission of second portion 115 to modifying module 130 an amount of time allowing for the synchronization with interactive input 132. In one embodiment, the amount of delay is on the order of milliseconds.

Figure 2:
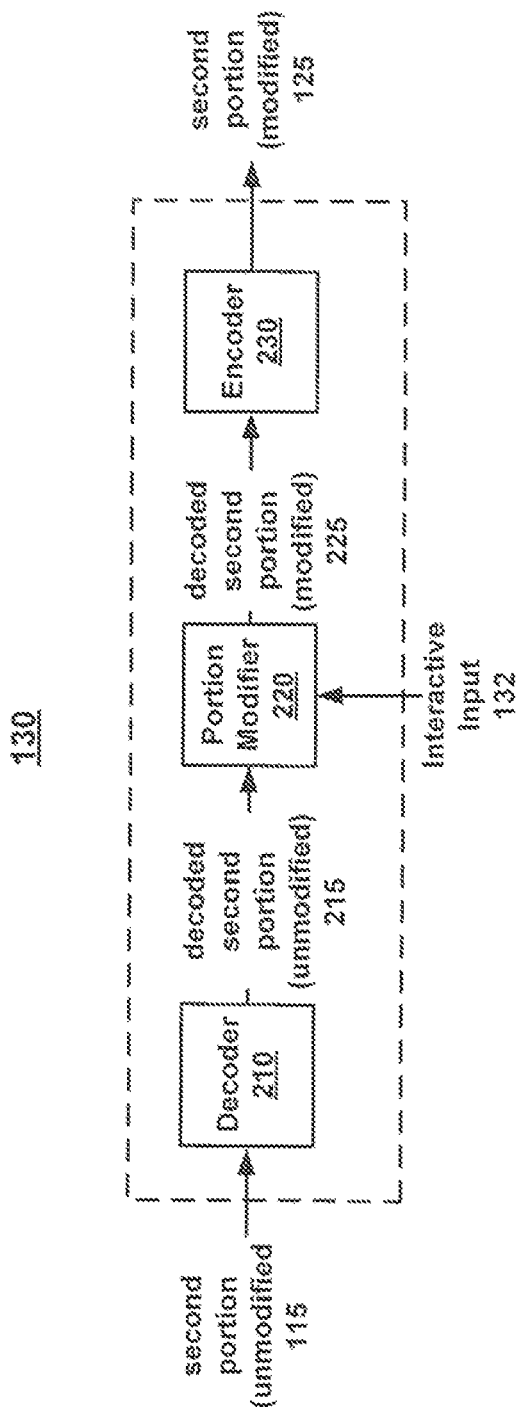
FIG. 2 is a block diagram of a system for modifying a portion of a frame of media according to interactive input, in accordance with one embodiment of the present invention.

Modifying module 130 receives second portion 115 and is configured to modify second portion 115 according to interactive input 132. FIG. 2 is a block diagram of a modifying module 130 for modifying a portion of a frame of media according to interactive input 132, in accordance with one embodiment of the present invention. Modifying module 130 includes decoder 210, portion modifier 220 and encoder 230. It should be appreciated that decoder 210, portion modifier 220 and encoder 230 can be implemented as software, hardware, firmware, or any combination thereof. Moreover, it should be appreciated that modifying module 130 may include additional components that are not shown so as to not unnecessarily obscure aspects of the embodiments of the present invention.

In one embodiment, modifying, module 130 is deployed at a network node. In another embodiment, for wireless cellular network deployment, modifying module 130 can be implemented as a component of IP Multimedia Subsystem (IMS) inside the wireless core network of 3GPP Release 6 or later.

It should be appreciated that embodiments of the present invention provide a collective interactive experience for a group of users. Accordingly, a group of users may have access to modifying module 130. In the present embodiment, each user of a group may be able to provide individual interactive input 132, and the video data is modified according to the collective interactive input. A plurality of users can contribute interactive input 132 to video data 105, so that each user of the group observes all interactive input. For example, each observer of a television program can provide commentary to the program by transmitting interactive input 132 to system 100.

Decoder 210 receives second portion 115 and is configured to decode second portion 115. Decoded second portion 215 is received at portion modifier 220 configured to modify decoded second portion 215 according to interactive input 132. It should be appreciated that interactive, input 132 can be received in various forms. In one embodiment, interactive input 132 includes a video stream to be overlaid on top of decoded second portion 215. In one embodiment, the video stream is decoded prior to receipt at portion modifier 220. Portion modifier 220 is configured to generate modified decoded second portion 225 by modifying decoded second portion 225.

It should be appreciated that interactive input 132 can be associated with many different interactive streaming video applications, such as personalized ad-insertion, interactive television, and video-enabled remote collaboration tools for utilizing localized interactivity of a video stream. For example, video data 105 of FIG. 1 may be associated with a television program. Observers of the television program may transmit interactive input 132 to system 100 for modifying the modifiable portion of video data 105. For example, interactive input 132 may include text commentary, graphics such as personal avatars, and may include an audio portion.

In another embodiment, interactive input 132 includes avatars controlled by dual-tone multiple frequency (DTMF), extending the usage of the described embodiments to cellular telephones capable of generic video streaming. In another example, the interactive input can include a personalized advertisement.

In one embodiment, portion modifier 220 modifies decoded second portion 215 by overlaying interactive input 132 on top of decoded second portion 215. In one embodiment, an observer can contribute to the modification of video data 105 by sending interactive input 132 in real-time. Portion modifier 220 is constructs a new video stream overlaid with corresponding interactive input 132. In one embodiment, portion modifier 220 overlays interactive input 132 in the pixel domain. Pixel domain operations support a rich set of interactive input such as changes in avatar location, speed, size, and opacity. The use of partial encoding helps to reduce overall complexity of the associated computations.

Embodiments of the present invention provide for modifying only a portion of video data 105. For instance, where a primary purpose of an observer is to view video data 105, the modifiable region of video data 105 only occupies a portion of the frame. By providing localized interactivity that only requires the modification of a portion of a frame, it is not necessary to decode, modify, and re-encode those portions that are not subject to localized interactivity. Various embodiments provide partial transcoding whereby only the necessary part of a video stream is processed.

It should be appreciated that embodiments of the present invention perform decoding, modifying, and re-encoding of only a portion of video data 105. This translates to computation savings, as the non-modified portion of the video data is transmitted over a network without decoding, modifying, and re-encoding.

The modified decoded second portion 225 is encoded at encoder 230, generating modified second portion 125.

Transmitter 140 is configured to transmit first portion 112 and second portion 125 in a single stream, indicated as video data 145. As described above, first portion 112 is not subjected to decoding, modifying and re-encoding. In one embodiment, first portion 112 for a corresponding frame is received at transmitter 140 prior to second portion 125 for the corresponding frame. Accordingly, first portion 112 can be transmitted in the stream prior to second portion 125 for a given frame.

Transmitting first portion 112 prior to second portion 125 for a given frame allows system 100 to leverage the latency requirements of the video stream. In other words, embodiments of the present invention provide for combining packets with different latency requirements within the same video frames. Specifically, information corresponding to regions that will not be modified can be delivered in a high latency mode. This is because the observers who do not interact with video data 105 can be viewing it with a sizeable delay, with the only limitation of not introducing excessive start-up latency. Conversely, regions that are being modified in response to interactive input 132 issued by the observers need to be conveyed to all observers quickly in a low latency mode, in order to provide an interactive community experience.

Furthermore, forcing all packets to follow strict deadlines can be potentially inefficient. In particular, longer latencies allow for one-way streaming to be used, with lesser need for overhead for packet-loss recovery (e.g., lost packets can always be retransmitted so the overhead matches actual network behavior).

Even when packet losses need not be considered, gains are possible by exploiting statistical multiplexing. For example, in one embodiment, better video quality can be achieved when operating the encoder in variable bit rate (VBR) mode. In order to transmit VBR encoded video it is necessary to enable rate averaging by either supporting VBR transmission (e.g., allowing variable bandwidth) or by averaging the rate needs over time. Embodiments of the present invention support both modalities, leading to improved quality. First, the longer latency enables the unchanged part of the stream to benefit from a large buffering, so that VBR encoded data can be transmitted with constant or near constant bandwidth. Second, while the modified part of the stream is transmitted under a tight deadline, better performance can be achieved by letting the bandwidth vary. Thus, the overall bandwidth can be constant but the low latency part of stream can be transmitted at a variable rate. The high latency part of the stream can absorb these variations (in its own rate and in the bandwidth) using buffering.

It should be appreciated that system 100 can be modified to support multiple instances of the modification of video data 105. In one embodiment, modifying module can receive different instances of interactive input 132 and can generate multiple instances of second portion 125 based on the different instances. In the present embodiment, each instance of the second portion 125 can be transmitted to different destinations, while each destination would receive first portion 112. In another embodiment, system 100 includes a plurality of modifying modules 130, each dedicated to a different modification of video data 105.

Figure 4:
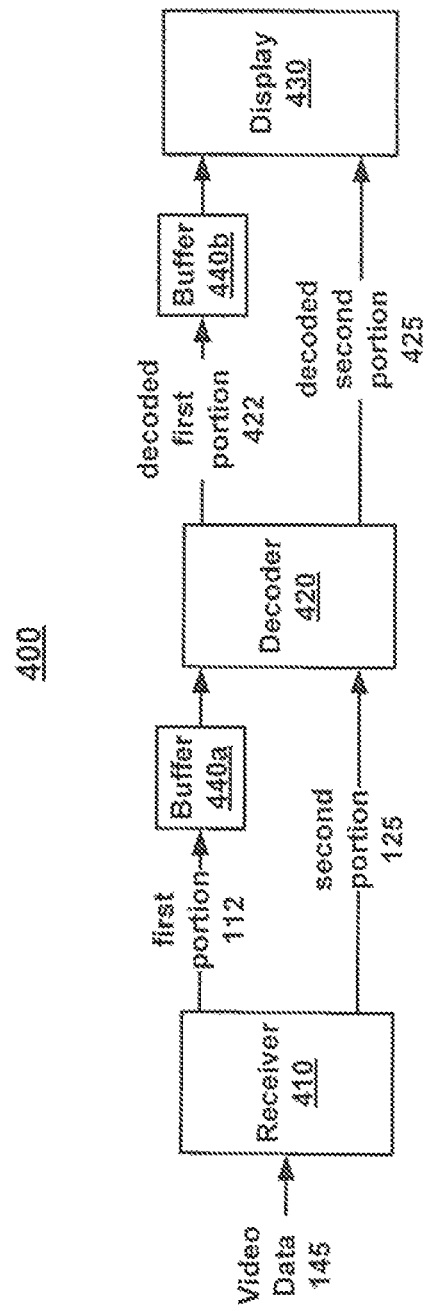
FIG. 4 is a block diagram of a system for displaying video data, in accordance with one embodiment of the present invention.

FIG. 4 is a block diagram of a system 400 for displaying video data, in accordance with one embodiment of the present invention. System 400 includes receiver 410, decoder 420 and display 430. In various embodiments, system 400 may also include buffer 440a and/or buffer 440b. In one embodiment, system 400 is implemented in a computing device capable of communicating over a network connection (not shown). For example, system 400 may be any type of computing device, including without limitation computers, cellular telephones, personal digital assistants, television sets, set-top boxes, and any other computing device capable of receiving and transmitting, data over a network.

It should be appreciated that receiver 410, decoder 420, display 430 and buffers 440a and 440b can be implemented as software, hardware, firmware, or any combination thereof. Moreover, it should be appreciated that system 400 may include additional components that are not shown so as to not unnecessarily obscure aspects of the embodiments of the present invention.

Receiver 410 is configured to receive video data 145 including a plurality of portions of video data, e.g., first portion 112 and second portion 125 of FIG. 1, in a single stream. It should be appreciated that in embodiments of the present invention, first portion 112 is received prior to second portion 125. In one embodiment, first portion 112 is buffered at buffer 440a prior to the receipt of second portion 125. First portion 112 and second portion 125 are then decoded at decoder 420. In one embodiment, where second portion 125 is not independently decodable from first portion 112, decoder 420 decodes second portion 125 using first portion 112. It should be appreciated that, in one embodiment, first portion 112 may be decoded independent of second portion 125 and decoded first portion 422 can be buffered at buffer 440b while first portion 112 is buffered at buffer 440a until second portion 125 is received and decoded.

In one embodiment, first portion 112 is decoded, generating decoded first portion 422, prior to the receipt of second portion 125 at receiver 410, and decoded first portion 422 is buffered at buffer 440b until second portion 125 is decoded. Second portion 125 is decoded at decoder 420, generating decoded second portion 425. Decoded first portion 422 and decoded second portion 425 for a corresponding frame are displayed at display 430.

Figure 5:
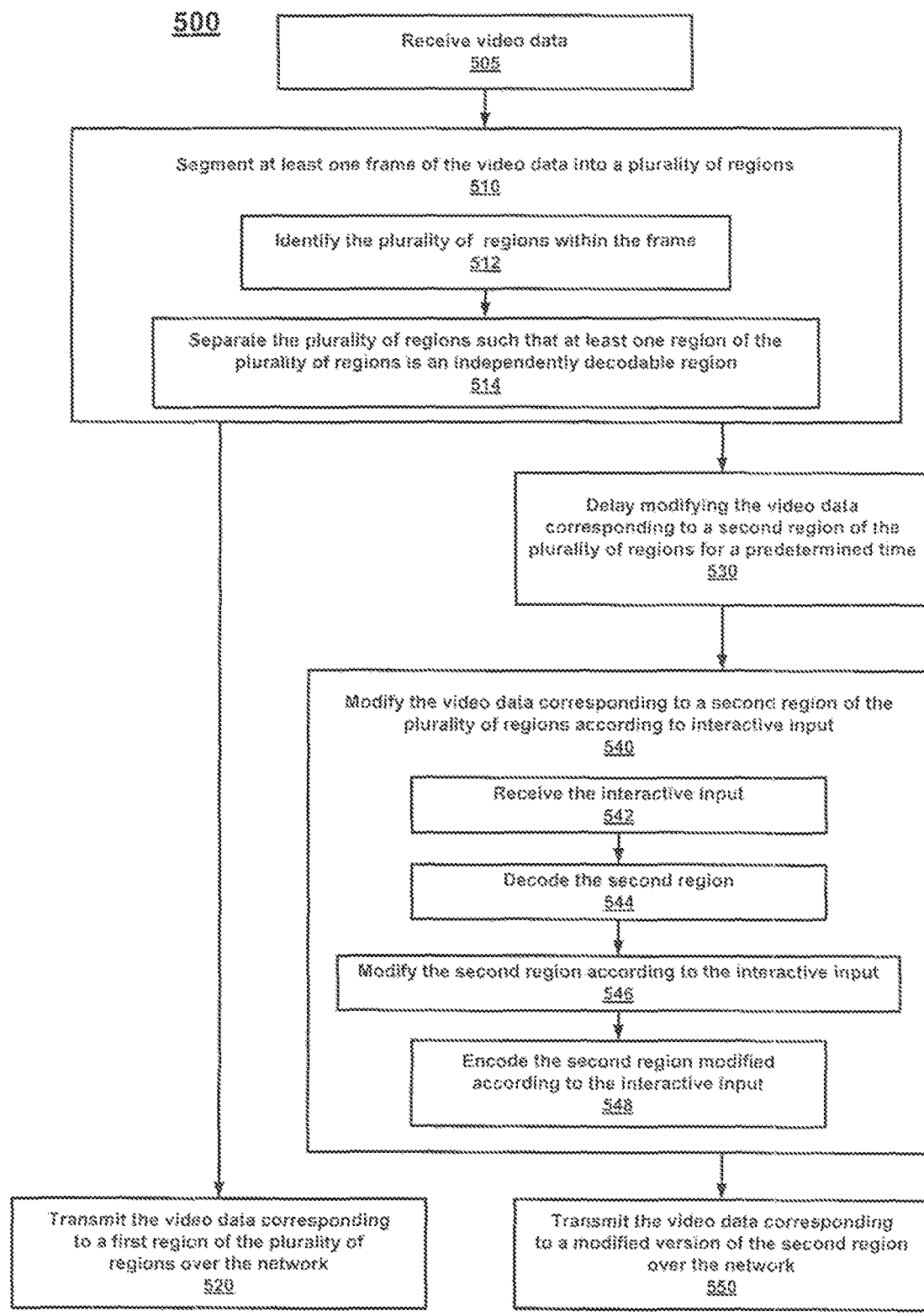
FIG. 5 is a flowchart illustrating a process for streaming video data, in accordance with one embodiment of the present invention.

FIG. 5 is a flowchart illustrating a process 500 for streaming video data, in accordance with one embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 500 is performed by system 100 of FIG. 1.

At block 505 of process 500, video data is received. In one embodiment, the video data is encoded using H.263 video coding standard.

At block 510, at least one frame of the video data is segmented into a plurality of regions. In one embodiment, as shown at block 512, the plurality of regions within the frame is identified. At block 514, the plurality of regions is separated into such that at least one region of the plurality of regions is an independently decodable region. In one embodiment, at least two regions of the plurality of regions are independently decodable regions.

At block 520, the video data corresponding to a first region of the plurality of regions over a network is transmitted.

In one embodiment, as shown at block 530, the modifying of the video data corresponding to the second region is delayed for a predetermined time.

At block 540, the video data corresponding to a second region of the plurality of regions is modified according to interactive input. In one embodiment, the interactive input comprises information configured to modify a portion of the frame for presentation.

In one embodiment, as shown at block 542, the interactive input is received. At block 544, the second region is decoded. At block 546, the second region is modified according to the interactive input. In one embodiment, the interactive input is overlaid on top of the second region in the pixel domain. At block 548, the second region modified according to the interactive input is encoded, generating the modified version of the second region.

It should be appreciated that in accordance with embodiments of the present invention, block 540 may be performed for different instances of interactive input. In the present embodiment, the video data corresponding to the second region of the plurality of regions is modified according to second interactive input.

At block 550, the video data corresponding to a modified version of the second region is transmitted over the network. In one embodiment, the transmitting the video data corresponding to the modified version of the second region of block 550 is performed subsequent the transmitting the video data corresponding to the first region of block 520. In one embodiment, the video data corresponding to the first region is transmitted using a high latency mode and the video data corresponding to the second region is transmitted using a low latency mode.

In one embodiment, where there is a modified version and a second modified version of the second region, the video data corresponding to a second modified version of the second region is transmitted over the network. In the present embodiment, the video data corresponding to the modified version of the second region and the video data corresponding to the second modified version of the second region are transmitted to different destinations.

Figure 6:
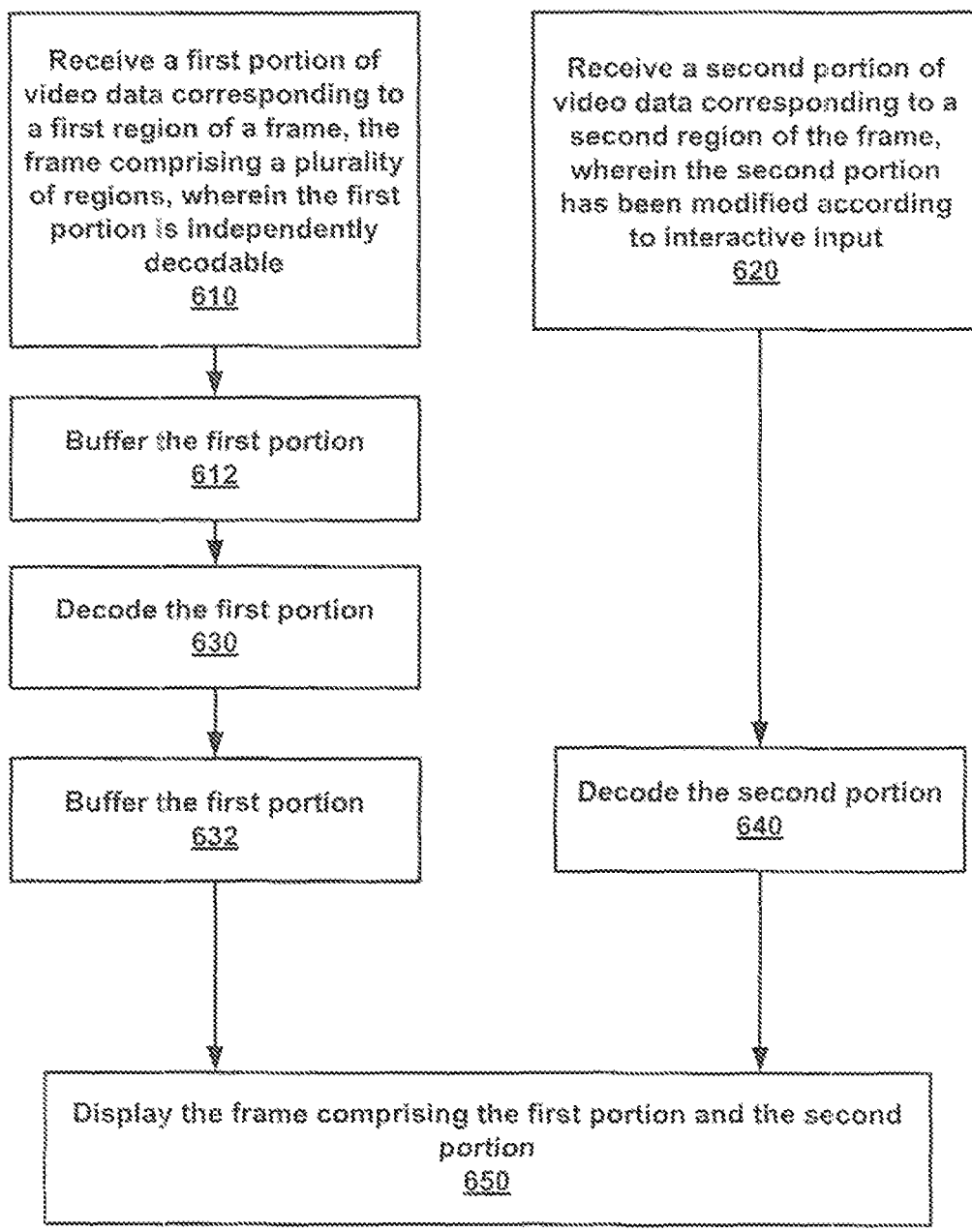
FIG. 6 is a flowchart illustrating a process for displaying video data, in accordance with one embodiment of the present invention.

FIG. 6 is a flowchart illustrating a process 600 for displaying video data, in accordance with one embodiment of the present invention. In one embodiment, process 600 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 600 is performed by system 400 of FIG. 4.

At block 610 of process 600, a first portion of video data corresponding to a first region of a frame is received, in which the frame comprises a plurality of regions, wherein the first portion is independently decodable. At block 620, a second portion of video data corresponding to a second region of the frame is received, in which the second portion has been modified according to interactive input. In one embodiment, the second portion is independently decodable. It should be appreciated that block 610 and block 620 can be performed in any order. In one embodiment, block 610 is performed prior to block 620.

At block 630, the first portion is decoded. In one embodiment, the first portion is buffered prior to block 630, as shown at block 612. In one embodiment, the first portion is buffered subsequent block 630, as shown at block 632. It should be appreciated that, in accordance with various embodiments, the buffering of block 612 and/or block 632 is dependent on the receipt of the second portion at block 620.

At block 640, the second portion is decoded. In one embodiment, where the second portion is not independently decodable, the second portion is decoded based at least in part on the first portion. At block 650, the frame comprising the first portion and the second portion is displayed.

Embodiments of the present invention perform bitstream parsing (without decoding) to split the compressed bitstream into at least two regions, one that is to remain unchanged (fixed region) and one subject to modification by interactive input (modifiable region). Decoding, modifying, and subsequent encoding are only performed on the modifiable region. Therefore, the computing load at system 100 is reduced over a system requiring the decoding, modifying and re-encoding of the entire bitstream. It should be appreciated that while the use of separable video generally incurs a penalty in compression efficiency, avoiding the re-encoding of the fixed region can lead to higher video quality at the recipient.

Embodiments of the present invention provide for separating frames into fixed regions and modifiable regions that can be transmitted using different latency requirement. In one embodiment, the present invention provides for transmitting portions of data associated with fixed regions using a high latency mode and for transmitting portions of data associated with modifiable regions using a low latency mode. Since high latency modes have lower processing and timing requirements than low latency modes, the costs of transmitting the video data are reduced over transmitting all video data using a low latency mode.

Various embodiments of the present invention, a method for streaming video data, are thus described. While the present invention has been described in particular embodiments, it should be appreciated that the present invention should not be construed as limited by such embodiments, but rather construed according to the following claims.

What is claimed is:

1. A method for streaming video data, the method comprising:
   receiving the video data;
   segmenting a frame of the video data into a plurality of regions, including a fixed region that is unmodifiable and a modifiable region;
   transmitting the fixed region of the video data over a network;
   modifying the modifiable region of the video data according to an interactive input;
   transmitting a modified version of the modifiable region of the video data over the network;
   modifying the modifiable region of the video data according to a second interactive input to generate a second modified version of the modifiable region; and
   transmitting the second modified version of the modifiable region over the network,
   wherein the modified version of the modifiable region and the second modified version of the modifiable region are transmitted to different destinations.

2. The method of claim 1, wherein the transmitting the modified version of the modifiable region is performed subsequent to the transmitting the fixed region.

3. The method of claim 1, wherein prior to modifying the modifiable region, the method comprises:
   delaying the modifiable region for a predetermined time to receive the interactive input.

4. The method of claim 1, wherein the fixed region and the modifiable region are decodable independently from each other.

5. The method of claim 1, wherein the modifying the modifiable region according to the interactive input comprises:
   receiving the interactive input;
   decoding the modifiable region;
   modifying the modifiable region according to the interactive input; and
   encoding the modified region to generate the modified version of the modifiable region.

6. The method of claim 1 wherein the video data is encoded using H.263 video coding standard.

7. The method of claim 1, wherein the interactive input comprises information to modify a portion of the frame for presentation.

8. The method of claim 1, wherein the fixed region is transmitted using a high latency mode and the modifiable region is transmitted using a low latency mode.

9. A non-transitory computer readable medium storing instructions that when executed by one or more processors cause the one or more processors to:
   receive the video data;
   segment a frame of the video data into a plurality of regions, including a fixed region that is unmodifiable and a modifiable region;
   transmit the fixed region of the video data over a network;
   modify the modifiable region of the video data according to interactive input;
   transmit a modified version of the modifiable region over the network;
   modify the modifiable region of the video data according to a second interactive input to generate a second modified version of the modifiable region; and
   transmit the second modified version of the modifiable region over the network,
   wherein the modified version of the modifiable region and the second modified version of the modifiable region are transmitted to different destinations.

10. The non-transitory computer readable medium of claim 9, wherein the one or more processors are to transmit the modified version of the modifiable region subsequent to transmitting the fixed region.

11. The non-transitory computer readable medium of claim 10, wherein prior to modifying the modifiable region, the instructions are to cause the one or more processors to delay the modifiable region for a predetermined time to receive the interactive input.

12. The non-transitory computer readable medium of claim 9, wherein the fixed region and the modifiable region are decodable independently from each other.

13. The non-transitory computer readable medium of claim 9, wherein to modify the modifiable region, the instructions are to cause the one or more processors to:
   receive the interactive input;
   decode the modifiable region;
   modify the decoded region according to the interactive input; and
   encode the modified region to generate the modified version of the modifiable region.

* * * * *